United States Patent [19]

Ohnishi et al.

[11] 3,806,893

[45] Apr. 23, 1974

[54] METHOD OF ELECTRICALLY DETECTING COLLOIDAL MEMORY

[75] Inventors: Joichi Ohnishi; Isao Ota, both of Osaka, Japan

[73] Assignee: Matsushita Electric Industrial Co., Ltd., Kadoma, Osaka, Japan

[22] Filed: July 27, 1972

[21] Appl. No.: 275,743

[30] Foreign Application Priority Data

July 29, 1971 Japan ................................ 46-57368

[52] U.S. Cl...... 340/173 CH, 324/71 R, 340/173 PP

[51] Int. Cl. ............................................ G11c 13/02

[58] Field of Search ........... 324/71 R; 340/173 CH, 340/173 PP

[56] References Cited

UNITED STATES PATENTS

| | | | |
|---|---|---|---|
| 3,060,317 | 10/1962 | Winogradoff | 340/173 CH |
| 3,158,798 | 11/1964 | Sauder | 340/173 CH |
| 3,691,533 | 9/1972 | Bogenberger | 340/173 CH |
| 3,499,167 | 3/1970 | Baker | 340/173 CH |
| 3,668,106 | 6/1972 | Ota | 204/299 |
| 3,511,651 | 5/1970 | Rosenberg | 96/1.5 |

*Primary Examiner*—Vincent P. Canney
*Assistant Examiner*—Stuart N. Hecker
*Attorney, Agent, or Firm*—Wenderoth, Lind & Ponack

[57] ABSTRACT

A method of detecting the existance of a colloidal memory state which comprises detecting rectifying characteristics in an electrophoretic suspension layer interposed between a pair of electrodes, said electrophoretic suspension layer consisting of at least one electrophoretic material in a finely divided powder form suspended in a liquid.

8 Claims, 4 Drawing Figures

METHOD OF ELECTRICALLY DETECTING COLLOIDAL MEMORY

BACKGROUND OF THE INVENTION

This invention relates to a method of detecting the existance of a colloidal memory state.

It is well known that when a d.c. electric field is applied across an electrophoretic suspension interposed between a pair of electrodes, the electrophoretic material moves electrophoretically and is deposited on either a cathode or an anode, dependent upon its charge polarity, and remains thereon even after removal of the d.c. electric field. This phenomenon that the electrophoretic colloidal material remains deposited on the surface of an electrode even after removal of an electric field is called the "colloidal memory" state in the present invention. A method of detecting electrically the existance of the colloidal memory state is not known to date in the art.

SUMMARY OF THE INVENTION

An object of the present invention is to define a method of detecting electrically the existance of a colloidal memory state. An additional object of the present invention is to define a method of reading out electrically the visible information produced on an electrophoretic suspension layer. These objects are achieved by the method according to the present invention which comprises detecting rectifying characteristics in an electrophoretic suspension layer interposed between a pair of electrodes, said suspension layer consisting of at least one electrophoretic material in a finely divided powder form suspended in a liquid.

Other objects and advantages of this invention will be apparent from the following description, the accompanying drawings and the appended claims.

DETAILED DESCRIPTION OF THE INVENTION

Figure 1:
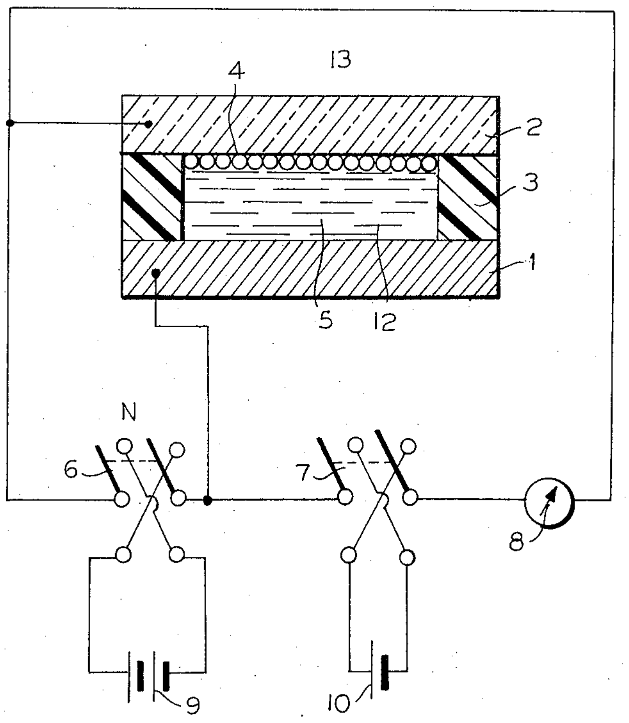
FIG. 1 is a cross-sectional view, partly diagrammatic, of an apparatus for carrying out the present invention.

A cell 13 in FIG. 1 has the basic construction of a colloidal memory cell used in the present invention and is composed of a spacer 3, tow opposed electrodes 1 and 2, and an electrophoretic suspension layer 5 which consists of a liquid 12 and an electrophoretic material 4 in a finely divided powder form. A d.c. electric field is applied across said electrophoretic suspension layer 5 to cause electrophoretic deposition of the electrophoretic material 4 on an electrode surface through a switch 6 positioned at either P or N from a battery 9. Said switch 6 is used for selection of said electric field polarity. Another battery 10, another switch 7 and an ammeter 8 are used to detect the existance of the colloidal memory state. It was observed that rectifying characteristics existed between said two electrodes 1 and 2 when said electrophoretic material 4 was deposited on one of said electrodes 1 and 2 upon application of a d.c. voltage across said electrodes 1 and 2 shown in FIG. 1.

It is now presumed that said rectifying characteristics are due to the difference between work functions of said electrophoretic material 4 and said electrode 2 upon which said electrophoretic material 4 is deposited. The present invention is based on the utilization of this rectifying characteristics between the electrodes 1 and 2. Three distribution states of the electrophoretic material 4 are possible, that is, the electrophoretic material 4 being uniformly dispersed throughout the liquid 12, the electrophoretic material 4 is deposited on one electrode, and the electrophoretic material 4 is deposited on the other electrode. These can be detected electrically by the method of this invention which comprises applying a voltage across the electrodes 1 and 2 first in one direction and then in the other direction, and then comparing electric current values passing across the electrodes 1 and 2 to see whether in one direction they are greater than, or less than in the other direction. Rectifying characteristics are found to exist when the greater current flow is found toward the electrode having the electrophoretic material deposited thereon. When it is desired that information memorised in the colloidal memory device be preserved even after reading out, the electric potential of said battery 9 must be sufficiently low not to cause redispersion of the electrophoretic material 4 deposited on the electrode. The colloidal memory device shown in FIG. 1 is only a basic one.

Figure 2:
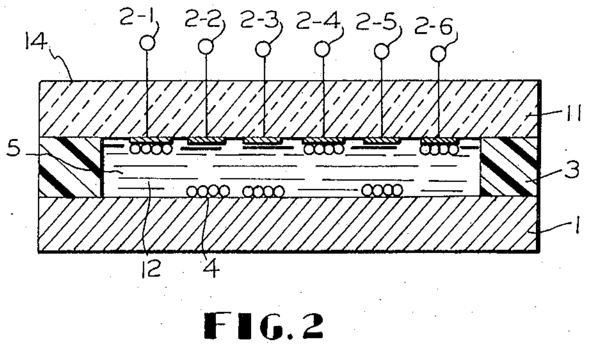
FIG. 2 is a cross-sectional view of another embodiment of the electrophoretic suspension device according to this invention
Figure 3:
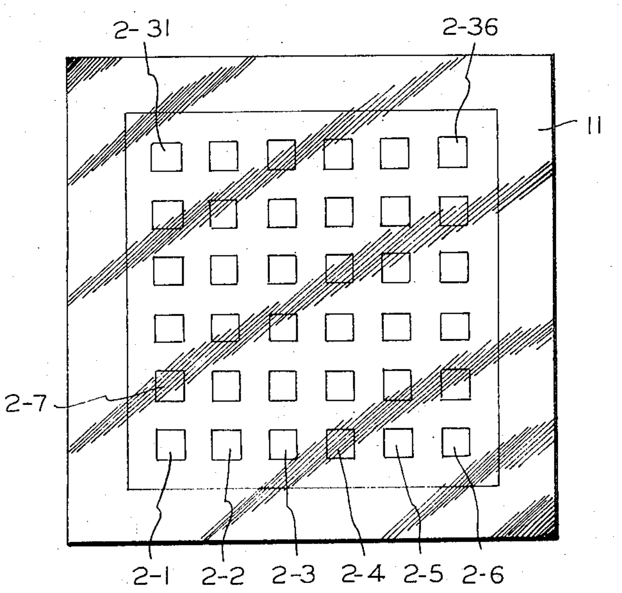
FIG. 3 is a front view of FIG. 2.

In FIG. 2, a colloidal memory device 14 is provided which has a plurality of colloidal memory cells therein. An electrophoretic suspension layer 5 which consists of an electrophoretic material 4 and a liquid 12 is interposed between an upper plate 11 such as glass, plastic or ceramic plate with plural dot-shaped electrodes 2-1, 2-2 , . . . . , 2-5 and 2-6 provided thereon, and a lower common electrode 1 such as a metal plate. The device 14 shown in FIG. 2 can memorize a plurality of items of electric information therein. An electrophoretic material 4 is deposited on either said common electrode 1 or a selected one of said dot-shaped electrodes 2-1, 2-2 , . . . , 2-5 and 2-6 , according to the polarity of the d.c. voltage applied across said common electrode 1 and the selected one of said dot-shaped electrodes. The polarity of the applied d.c. voltage is thus memorized in the device as a distribution state of said electrophoretic material 4. The construction of a colloidal memory device having a plurality of colloidal memory cells is not limited to the structure of FIG. 2.

Figure 4:
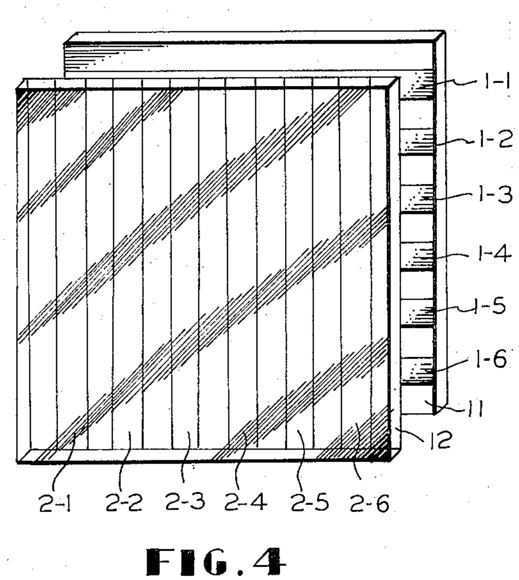
FIG. 4 is a schematic perspective view of another device which is used for carrying out the present invention.

In FIG. 4, one electrode 1 consists of a plurality of stripes 1-1 , 1-2 , . . . , 1-5 and 1-6 of electrode material which are parallel to each other and the other electrode 2 consists of a plurality of stripes 2-1 , 2-2 , . . . , 2-5 and 2-6 of electrode material which are parallel to each other and orthogonal to said first plurality of electrode stripes. Said electrodes 1 and 2 have interposed therebetween an electrophoretic suspension layer 5 (not shown in FIG. 4) which consists of a liquid 12 and an electrophoretic material 4 in a finely divided powder form suspended in the liquid 12. A d.c. electric field is applied across one electrode selected from among strip electrodes 1-1, 1-2, 1-3, . . . and one electrode selected from among strip electrodes 2-1, 2-2, 2-3, . . . for example, across strip electrodes 1-2 and 2-3. The portion of the suspension layer 5 at the intersection of the two strip electrodes 1-2 and 2-3 is actually subjected to a d.c. electric field and forms one colloidal memory cell. A selection of more than one strip electrode from among the strip electrodes forming the electrode 1 and electrode 2 makes it possible to memorize a plurality of input electric signals.

If the electrophoretic suspension layer 5 described above consists of, for example, a colored liquid which includes an electrophoretic material the color of which differs from that of the liquid or consists of a liquid which includes at least two electrophoretic materials, one of which differs in color and charge polarity from the other, the electrophoretic suspension layer 5 of such a composition is changeable in color upon application of a d.c. electric field thereto. A display device utilizing such an electrophoretic suspension layer is described in the U.S. Pat. No. 3,668,106.

Therefore, if the electrode 1 in FIG. 1 or 2, or the plate 11 and the electrode 1 attached thereon are transparent, and the electrophoretic suspension layer 5 is changeable in color upon application of an electric field, the colloidal memory devices as shown in FIG. 1–4 can not only electrically memorize input electric signal but also display visible in-formation in accordance with the input electric signal. The visible information displayed on the colloidal memory devices as shown in FIGS. 1–4 can thus be read out not only visually but also electrically by the method of the present invention.

EXAMPLE

An electrophoretic suspension is made by mixing four substances according to table 1 and by applying supersonic waves to the mixture. Three colloidal memory cells as shown in FIG. 1 are prepared. The three cells contain said suspension in a space having a thickness of 50$\mu$m utilizing a 50$\mu$m thick polyester spacer. The electrodes 1 and 2 are two aluminum plates (Al—Al), two copper plates (Cu—Cu) and two tin oxide films ($SnO_2$—$SnO_2$) coated on two glass plates respectively. An electrophoretic test shows that titanium dioxide ($TiO_2$) particles in said suspension are charged positively. The d.c. voltages applied from the batteries 9 and 10 as shown in FIG. 1 are 200 volts and 50 volts respectively. Forward and reverse current values measured with the ammeter 8 are shown in table 2. It is obvious in table 2 that rectifying characteristics exist between electrodes 1 and 2 in all colloidal memory cells described above.

TABLE 1

| substances | volume |
|---|---|
| olive oil | 50ml |
| benzene | 50ml |
| polyoxyethylene sorbitan trioleate | 0.1 gram |
| electrophoretic material $TiO_2$ | 13 gram |

TABLE 2

| | electric field polarity | |
|---|---|---|
| electrode material | electric covered with $TiO_2$ is negative | electrode covered with $TiO_2$ is positive |
| Al–Al | 37$m\mu A/cm^2$ | 18$m\mu A/cm^2$ |
| Cu–Cu | 44$m\mu A/cm^2$ | 18$m\mu A/cm^2$ |
| $SnO_2$–$SnO_2$ | 40$m\mu A/cm^2$ | 20$m\mu A/cm^2$. |

What is claimed is:

1. A method of electrically detecting the existance of a colloidal memory state of a colloidal memory cell having an electrophorectic suspension layer interposed between a pair of electrodes, said electrophoretic suspension layer being a liquid having at least one electrophoretic material dispersed therein, said method comprising applying a detecting voltage between said pair of electrodes first in one direction and then in the opposite direction, which detecting voltage is less than the voltage necessary to cause the electrophoretic material to move to one or the other electrodes, and determining in which direction the current flow at the detecting voltage is greater, whereby the electrode toward which the greater current is flowing is indicated as being the electrode having the electrophoretic material thereon.

2. The method as claimed in claim 1 wherein at least one of said pair of electrodes is transparent.

3. The method as claimed in claim 1 wherein said liquid is colored.

4. The method as claimed in claim 1 wherein said electrophoretic suspension layer includes two electrophoretic materials, one of which differs in color and charge polarity from the other.

5. The method as claimed in claim 1, wherein said liquid comprises olive oil, benzene and polyoxyethylene sorbitan trioleate, and said electrophoretic material comprises $TiO_2$.

6. The method as claimed in claim 1 wherein at least one of said pair of electrodes is divided into a plurality of electrodes.

7. The method as claimed in claim 6 wherein said plurality of electrodes are in the shape of dots.

8. The method as claimed in claim 6 wherein one of said pair of electrodes consists of a plurality of strips of electrode material which are parallel to each other, and the other of said pair of electrodes consists of a plurality of strips of electrode material which are parallel to each other and are orthogonal to said one electrode strips.

* * * * *